United States Patent [19]

Jackson, Jr. et al.

[11] Patent Number: 5,654,395
[45] Date of Patent: Aug. 5, 1997

[54] REINFORCED POLYESTER COMPOSITIONS AND METHOD OF MAKING SAME

[75] Inventors: Winston Jerome Jackson, Jr., Kingsport, Tenn.; William Ronald Darnell, Weber City, Va.

[73] Assignee: Eastman Chemical Company, Kingsport, Tenn.

[21] Appl. No.: 695,067

[22] Filed: May 3, 1991

[51] Int. Cl.$^6$ .................... C08G 63/80; C08G 63/85; C08G 63/87

[52] U.S. Cl. .................. 528/308.3; 523/215; 523/217; 524/494; 524/495; 524/496; 524/878; 528/272; 528/279; 528/285; 528/307

[58] Field of Search .................. 524/496, 495, 524/494, 878; 523/215, 217; 528/272, 279, 285, 307, 308.3; 428/35.7

[56] References Cited

U.S. PATENT DOCUMENTS

| | | | |
|---|---|---|---|
| 3,437,716 | 4/1969 | Leebrick | 525/13 |
| 3,463,742 | 8/1969 | Bell et al. | 502/172 |
| 3,814,725 | 6/1974 | Zimmerman et al. | 260/40 |
| 4,163,002 | 7/1979 | Pohl et al. | 524/878 |
| 4,223,113 | 9/1980 | Bier et al. | 525/439 |
| 4,690,860 | 9/1987 | Radvan et al. | 428/290 |
| 5,041,476 | 8/1991 | Wilder | 524/80 |
| 5,047,450 | 9/1991 | Wilder | 523/435 |

FOREIGN PATENT DOCUMENTS 3240382  5/1984  Germany.

OTHER PUBLICATIONS

Derwent Abstract WPI Acc. No. 89–367634/50 (JP 01275575).
Derwent Abstract WPI Acc. No. 74–39173V/21 (JP 74016787).
Derwent Abstract WPI Acc. No. 73–63554U/42 (JP 73033278).
Derwent Abstract WPI Acc. No. 73–63553U/42 (JP 73033277).
*Advanced Materials, The Newsletter of High Performance*, 11(16), Sep. 25, 1989.
J. A. Brydson, *Flow Properties of Polymer Melts*, 2d. Ed., pp. 67–69 (1981).
D. J. Brunelle et al., *J. Am. Chem. Soc.*, 112, pp. 2399–2402 (1981).
I. Goodman et al., *Polymer*, 1, pp. 384–396 (1960).

*Primary Examiner*—Paul R. Michl
*Assistant Examiner*—John J. Guarriello
*Attorney, Agent, or Firm*—Betty J. Boshears; Harry J. Gwinnell

[57] ABSTRACT

This invention relates to a method of preparing a reinforced polyester composition comprising the steps of:

I. mixing
   (a) at least one cyclic ester oligomer selected from the group consisting of ethylene terephthalate and cyclohexylenedimethylene terephthalate,
   (b) an organic initiator comprising one to five hydroxy groups which are capable of opening the cyclic ester rings,
   (c) a catalyst, and
   (d) a reinforcing material, II. heating the mixture of I at a temperature ranging from 270° C. to 320° C.

6 Claims, No Drawings

REINFORCED POLYESTER COMPOSITIONS AND METHOD OF MAKING SAME

FIELD OF THE INVENTION

This invention relates to a method of preparing reinforced polyester compositions by thermal, ring-opening polymerization of cyclic ester oligomers in the presence of various catalysts, initiator(s), and reinforcing materials. The method is useful in preparing the compositions of the invention which have advanced mechanical properties.

BACKGROUND OF THE INVENTION

The method of this invention is useful for the preparation of reinforced polyester compositions. There is a continuing need in various industrial arts for improved reinforced polyester compositions which are useful as composites. Composites are those materials formed by mixing extremely strong and stiff fibers in a polymer resin matrix or binder. The materials in this class have advanced mechanical properties. The fibers that dominate the field of advanced composites are, in order of chronological developmental, glass, boron on a tungsten filament core, graphite or carbon, and aromatic polyamides. They possess the desirable properties of low density and extremely high strengths and moduli.

It is well known to those skilled in the art that composites are difficult to prepare from high molecular weight polymers because it is difficult to get adequate "wetting" or flow of the high molecular weight polymer into the reinforcing material. It is a distinct advantage, therefore, to have a low molecular weight/low melt viscosity material (such as cyclic ester oligomers) which can be melted, flowed into the reinforcing material, and, subsequently, polymerized to attain high molecular weight and good toughness.

Composites based on cyclic polymers having high molecular weights, such as polycarbonates, polyetherimides, polyarylates, and polyketones, are known in the art as reported in the Newsletter of High Performance, entitled *Advanced Materials*, Vol. 11, No. 16, Sep. 25, 1989.

Also, the superior improved moldability and improved properties of a molded article obtained by reinforcing poly(alkylene terephthalate) resins such as poly(ethylene terephthalate) (PET) and poly(cyclohexylene dimethylene terephthalate) (PCT) has long been established (see e.g., U.S. Pat. No. 3,814,725).

The relationship between high molecular weight and high melt viscosity is well established. See *Flow Properties of Polymer Melts*, 2d Ed., published in 1981 by J. A. Brydson, pp. 67–69. Compositions having high molecular weights such as those known in the art are expected to have a high melt viscosity.

As described previously, a low melt viscosity is required in the preparation of the compositions of this invention in order to get adequate "wetting" or flow of the polymer into the reinforcing material.

In *J. Am. Chem. Soc.*, 112, pages 2399–2402, entitled "Remarkably Selective Formation of Macrocyclic Aromatic Carbonates: Versatile New Intermediates for the Synthesis of Aromatic Polycarbonates" (1990), the role of cyclic oligomers as intermediates in the preparation of aromatic polycarbonates is described. The journal article also describes the commercial importance of the use of ring-opening polymerization in the preparation of polyamides, aliphatic polyesters, silicones, and epoxide thermosets in the absence of reinforcing material.

Also, it is known in the art to polymerize cyclic oligomers of ethylene terephthalate in the absence of reinforcing material. Japanese Patent Publication 48-33277 (Publication Date: Oct. 12, 1973) to Nihon Ester KK, and *Polymer*, Volume 1, pages 384–396 (1960). However, the prior art does not show the combination of oligomers with reinforcing materials to attain good wetting prior to polymerization.

SUMMARY OF THE INVENTION

The problems noted above with known methods of preparing reinforced polyester compositions of the art are overcome with the method of preparing a reinforced polyester composition comprising the steps of:
I. mixing
  (a) at least one cyclic ester oligomer selected from the group consisting of ethylene terephthalate and cyclohexylenedimethylene terephthalate,
  (b) an organic initiator comprising one to five hydroxy groups which are capable of opening the cyclic ester rings,
  (c) a catalyst, and
  (d) a reinforcing material, and
II. heating the mixture of I at a temperature ranging from about 270° C. to about 320° C.

Moreover, the invention provides compositions which comprise:
  (a) a thermoplastic polyester prepared by ring opening polymerization of a cyclic ester oligomer selected from the group consisting of ethylene terephthalate and cyclohexylenedimethylene terephthalate; and
  (b) a reinforcing material.

The compositions and methods of the invention are useful for the preparation of molded articles, and for a variety of other industrial uses, such as making machine parts, sports equipment.

The advantages of the compositions and methods of the invention reside in the fact that a low molecular weight/low melt viscosity oligomer can be melted, then flowed into the reinforcing material, and, subsequently, polymerized to attain high molecular weight and good toughness. The invention also provides the advantage of improved surface smoothness of molded objects.

DETAILED DESCRIPTION OF THE PREFERRED EMBODIMENTS

The invention provides a method of preparing a reinforced polyester composition comprising the steps of:
I. mixing
  (a) at least one cyclic ester oligomer selected from the group consisting of ethylene terephthalate and cyclohexylenedimethylene terephthalate.

Component (a) is preferred to be a substance consisting essentially of at least one cyclic ester oligomer selected from the group consisting of ethylene terephthalate and cyclohexylenedimethylene terephthalate.

Oligomers are defined for the purposes of this invention as low molecular weight polymers that have at least 2 repeating units, but not more than 25 repeating units. A "cyclic" structure for purposes of this invention is defined as a structure which has no terminal groups or a structure which is essentially ring-like.

These oligomers are selected from the group consisting of ethylene terephthalate and cyclohexylenedimethylene terephthalate.

The cyclic ester oligomers of ethylene terephthalate may be obtained by extraction of the high molecular weight polymer for several hours with a solvent such as methylene chloride, filtering away the high molecular weight polymer so that the high molecular weight polymer is left in solid form and the low molecular weight polymer is liquefied. Then the methylene chloride solution is concentrated, and the product is dried. The product obtained is an oligomeric mixture containing a majority of cyclic trimer of ethylene terephthalate plus other cyclic species (such as tetramer, pentamer, etc.), bis(2-hydroxyethyl terephthalate), and other linear, low molecular weight polymeric species. An alternate method of obtaining the cyclic oligomers of ethylene terephthalate is described in Japanese Kokai Patent Gazette (A) 01-275-575 Application Date: 28 Apr. 1988) to Toyobo Company, Ltd. The method involves the preparation of polyethylene terephthalate having a high degree of polymerization (DP) from cyclic ethylene terephthalate. The cyclic oligomers of cyclohexylenedimethylene terephthalate may be prepared from, preferably, 0.15-0.40 inherent viscosity, 50% cis poly(1,3- or 1,4-cyclohexylenedimethylene terephthalate) by a cyclodepolymerization reaction. Cyclodepolymerization is defined as depolymerization of a linear polymer to form cyclic oligomer species.

This cyclodepolymerization reaction involves refluxing a 2-3 w/v % solution of the 50% cis poly(1,3- or 1,4-cyclohexylenedimethylene terephthalate) in a solvent such as 1,2,4-trichlorobenzene containing 100-200 ppm titanium tetraisopropoxide for several days and cooling the reaction mixture to room temperature. The mixture is then filtered to remove high molecular weight polymer, and the 1,2,4-trichlorobenzene is removed by distillation. The waxy mixture comprising the cyclic oligomers is then washed with warm methanol to minimize the residual cyclohexanedimethanol, filtered, and dried;

(b) an organic initiator comprising a compound containing one to five hydroxy groups which are capable of opening the cyclic ester; this opening of the cyclic ester is accomplished by alcoholysis.

Particularly preferred organic initiators are ones comprising from one to three hydroxy groups. Even more preferred organic initiators are ones comprising two hydroxy groups.

Examples of hydroxy compounds containing two hydroxyl groups per mole which may be used to prepare the new compositions of the invention include ethylene glycol, hexanediol, 1,4-cyclohexanedimethanol (cis or trans), 1,3-cyclohexanedimethanol (cis or trans), the monomer of poly (ethylene terephthalate), sometimes called bis(2-hydroxyethyl)terephthalate, and various low molecular weight, linear, essentially hydroxy-terminated oligomers derived from poly(ethylene terephthalate), or other polymeric material.

The preferred organic initiator is bis(2-hydroxyethyl terephthalate), or a mixture of bis(2-hydroxyethyl terephthalate) with other slightly higher molecular weight species which are substantially terminated with hydroxyl groups.

The initiator is not always required to be added in order to successfully prepare the composites of the invention. This is true because there are times the initiator is already present in the polymer sample from which the oligomers are separated. Also, the amount of hydroxyl-containing species which may act as an initiator will vary from one lot of cyclic monomers to another. The optimum amount of initiator, therefore, must be determined for a particular lot of monomer. In general, the amount of initiator added will vary up to 5-6 mole % (assuming two hydroxyls per molecule), depending on the volatility of the initiator and the amount of hydroxyl-containing species present in the cyclic oligomers;

(c) a catalyst in the presence of a reinforcing material; catalysts which may be used to prepare the compositions of the invention comprise one or more species selected from the group of catalysts known to be effective in esterification reactions, such as organic acid salts, carbonates, alcoholates, and oxides of metals such as zinc, manganese, cobalt, titanium, lead, and antimony.

Preferred catalysts are titanium, lead, and antimony. Even more preferred catalysts are titanium and antimony.

The amount of these catalysts required to be present will vary, depending on the temperatures at which the composition is being prepared, the thermal stabilities of the cyclic ester oligomer(s) and the composition product in the presence of the catalyst, the catalyst specie(s) being used, the rate of polymerization desired, and the acceptable level of residual cyclic oligomer in the composition.

In general, as the amount of catalyst increases, the polymerization rate increases, the amount of residual cyclic oligomer decreases, and the thermal stability decreases. Useful catalyst levels include 50-5000 ppm (based on the metal), but the preferred range for titanium is about 100-400 ppm, and the preferred range for antimony is about 400-2000 ppm; and (d) a reinforcing material, such as those described above for the compositions of the invention. Reinforcing materials which may be used to prepare the new thermoplastic compositions of the invention include unidirectional fibers or tows or woven fabrics of glass fiber, carbon fiber, boron fiber, and ceramic fiber. Glass fibers are preferred since they are less expensive to obtain.

The glass fibers suitable for use in the present invention may be in the form of glass filaments, threads, fibers, or whiskers, etc. and may be vary in length from about ⅛ to continuous length with a diameter from about 5-50 microns. Glass filaments or threads in the form of ribbons or fabrics are preferred. The glass fibers are commercially available and are well known in the art.

Carbon fibers are also preferred due to the increase in the tensile and stiffness properties of the composite formed.

Preferably, the amount of fibers which are present in the composition is from about 15-65% by weight. More preferably, the amount of fibers should be from about 15-50% by weight of the composition.

In addition to the reinforcing materials, the composition of this invention may also contain other fillers and additives such as mica, talc, flame retardants, stabilizers, and other processing aids and colorants.

Also, the compositions of this invention may contain additives commonly employed with polyester resins, such as mold release agents, antioxidants, tougheners and nucleating agents.

The reinforcing materials may be, optionally, treated or coated with materials which promote adhesion of the thermoplastic polyester matrix to the reinforcing material.

In Step I, items (a)–(d) do not have to be mixed sequentially in the context of this invention. Also, Step II should follow Step I. However, it is possible for items (a)–(c) to be rapidly mixed and melted before being transferred into a mold.

Further, the compositions of the invention are prepared by mixing the components together by any convenient means to obtain an intimate mixture, as long as polymerization of the cyclic oligomers does not occur before they can be made to flow into the reinforcing material.

The method of the invention also includes step II which involves heating the mixture of Step I at a temperature ranging from about 270° C. to about 320° C.;

Where the cyclic ester oligomers useful in the method described above are oligomers of ethylene terephthalate, the preferred temperature range is from about 300° to about 320° C. A more preferred temperature range is from about 300° to about 310° C. Where the cyclic ester oligomers useful in the method described above are oligomers of cyclohexylenedimethylene terephthalate, the preferred temperature range is from about 270° to about 300° C. A more preferred temperature range is from about 280° to about 290° C.

The reinforced polyester compositions of the invention comprise:

(a) a thermoplastic polyester prepared by ring opening polymerization of a cyclic ester oligomer selected from the group consisting of ethylene terephthalate and cyclohexylenedimethylene terephthalate; and (b) a reinforcing material.

A thermoplastic polyester is defined herein as a polyester that is sensitive to heat. Even when the final form has been assumed by applying heat, the original material can be reformed. Thermoplastic materials soften upon heating without destruction of the polyester. It can then be pressed, molded, extruded or cast into a desired shape into which it solidifies upon cooling. The softening and hardening processes are relatively fast so that the article can be molded, hardened by cooling and ejected from the mold in a matter of seconds rather than minutes.

The cyclic ester oligomers useful within the context of this invention have been described fully hereinabove. The reinforcing materials useful within the context of this invention have also been described fully hereinabove.

Ring-opening polymerization is a term readily understood by one skilled in the art. For the purpose of this invention, ring-opening polymerization is defined as a polymerization in which a ring-like or cyclic monomer is opened catalytically and/or by means of an initiator to form a linear species which is capable of opening other monomer rings. As the rings are opened, they are effectively added to the growing polymer chain to increase its molecular weight. This reaction continues until most of the cyclic monomer has been used up or until the chain becomes terminated.

The cyclic ester oligomer and the reinforcing material may be mixed in various ways to form the reinforced polyester composition as more fully described hereinafter. For example, the cyclic ester oligomer and the reinforcing material may be mixed before being introduced into a mold. They may be mixed by adding the cyclic ester oligomer to the reinforcing material which is already affixed into the mold. As stated previously, it is possible for items (a)–(c) to be rapidly mixed and melted before being transferred into a mold.

Further, it is not necessary for the mixing of the cyclic ester oligomer and the reinforcing material to occur in a mold. They may be mixed outside of a mold, as long as the mixing does not cause premature polymerization. The reinforced polyester composition can be reheated and reformed.

More particularly, the compositions may be prepared by several methods including single compression molding in which the reinforcing material is placed in the mold, the cyclic oligomer(s) containing the catalyst and initiator is spread over the reinforcing material, and the mold is closed and held at a sufficient temperature and time to cause polymerization of the cyclic ester oligomer. Other variations upon this procedure may also be used, such as by impregnating the reinforcing material (which had been earlier coated with the catalyst or the catalyst and the initiator) with the cyclic ester oligomer(s) by some method such as pultrusion and, subsequently, heating the composite (usually in a mold) at a temperature and time sufficient to effect polymerization.

The following examples are for illustrative purposes only, and not to limit the scope of the invention. All percentages are by weight, unless otherwise specified.

EXAMPLE 1

This example illustrates the preparation of a batch of cyclic oligomers derived from poly(ethylene terephthalate) containing bis(2-hydroxyethyl terephthalate) as an initiator and antimony catalyst.

To a 2000-ml, single-necked flask are added 55 grams of cyclic oligomers {extracted from poly(ethylene terephthalate) with methylene chloride, concentrated to dryness with a rotary evaporator, and vacuum dried at 140° C. overnight} and 800 ml of methylene chloride and the mixture is magnetically stirred for about an hour. In a small bottle, 0.3638 gram (0.00143 mole) (1.5 mole %) of bis(2-hydroxyethyl terephthalate) (BHET) is dissolved in 25 ml of methanol, and the solution is added slowly to the stirred solution/suspension of oligomer in methylene chloride. Separately, 0.080 gram (836 ppm Sb from antimony III ethylene glycoxide) is dissolved/suspended in 25 ml of methanol and is also slowly added to the stirred solution/suspension of oligomer in methylene chloride. The mixture (now containing cyclic oligomers, BHET, and antimony catalyst) is stirred for an additional 15 minutes, concentrated to dryness on a rotary evaporator, and vacuum dried at 140° C. overnight.

EXAMPLE 2

This example illustrates the preparation of a glass-filled thermoplastic composite (50 wt % glass) from cyclic oligomers derived from poly(ethylene terephthalate) using bis(2-hydroxyethyl terephthalate) (BHET) as an initiator.

A 2.5-in.×2.5-in piece of unidirectional glass (Orcoweb Fiberglass S-500) weighing 1.32 grams is placed on a 20-mil, chrome-plated brass plate, a 10-mil shim (3-in.×3-in. open space) is placed on the chrome-plated brass plate surrounding the glass fiber, and 1.32 grams of cyclic ester oligomer containing 1.5 mole % of added bis(2-hydroxyethyl terephthalate) and 836 ppm of antimony catalyst (prepared as described in Example 1) are spread over the glass fibers. A second chrome-plated brass plate is placed on top of the materials to complete the assembly, the corners of the assembly are clamped, and the assembly is placed on the lower platen of a Hannafin press preheated to 305° C. After about 10 seconds preheating of the assembly, the platens of the Hannafin press are closed, and the 'sandwiched' assembly is held at 305° C. for 20 minutes. After being cooled below 250° C., the assembly is opened and the composite is removed. The composite thus formed is tough and rigid.

EXAMPLE 3

This example illustrates the preparation of a carbon fiber-filled composite (42 wt % carbon) from cyclic oligomers derived from poly(ethylene terephthalate) using bis(2-hydroxyethyl terephthalate) (BHET) as an initiator.

Example 2 is repeated except a 2-in.×2-in. piece of carbon fabric (0.75 gram) (Gravitex fabric, 8 Harness Satin, from Courtaulds Advanced Materials, rinsed in methylene chloride and air dried) and 1.0 gram of cyclic ester oligomer, which is extracted as in Example I are used. The composite thus prepared is tough and rigid.

EXAMPLE 4

This example illustrates the preparation of a batch of cyclic oligomers derived from poly(ethylene terephthalate) containing cyclohexane-dimethanol (CHDM) as an initiator and antimony catalyst.

To a 2000-ml, single-necked flask are added 75 grams of cyclic oligomers derived from poly(ethylene terephthalate) (obtained as described in Example 1) and 900 Ml of dry methanol, and the mixture is magnetically stirred at room temperature for about an hour. To the stirred mixture is added 0.4219 gram (0.00293 mole) 2.25 mole %) of 74% trans-1,4-cyclohexanedimethanol, and the mixture is stirred for an additional 30 minutes. Separately, 0.1090 gram (~836 ppm Sb from antimony III ethylene glycoxide) is dissolved/ suspended in 30 ml of dry methanol and then slowly added to the previously-described, magnetically-stirred cyclic oligomers in methanol. After being stirred for an additional 15 minutes, the flask contents are concentrated to dryness with a rotary evaporator and vacuum dried at 100° C./24 hours/ 0.5 torr.

EXAMPLE 5

This example illustrates the preparation of a glass-filled thermoplastic composite (50 wt % glass) from cyclic oligomers derived from poly(ethylene terephthalate) using cyclohexanedimethanol as an initiator.

Example 2 is repeated except the batch prepared in Example 4 is used. The composite obtained is tough and rigid.

EXAMPLE 6

This example illustrates the preparation of a glass-filled, thermoplastic composite from cyclic oligomers derived from 95% cis poly(1,4-cyclohexylenedimethylene terephthalate) and titanium catalyst.

Cyclic oligomers of poly(cyclohexylene-dimethylene terephthalate) are obtained by the cyclodepolymerization of 0.25 I.V., 95% cis poly(1,4-cyclohexylenedimethylene terephthalate) in 1,2,4-trichlorobenzene in the presence of titanium tetraisopropoxide catalyst as generally described in the specification. A batch is then prepared from these cyclic oligomers and 200 ppm titanium (from tetraisopropoxide) by the general procedures described in Examples 1 and 4, except using dry isopropanol instead of methanol or methylene chloride. A tough, rigid thermoplastic composite is prepared in a Hannafin press (using the technique described in Example 2) at 285° C. for 25 minutes by the procedure described in Example 2.

As used herein, inherent viscosity (I.V.) is measured at 25° C. using 0.50 g of polymer per 100 mL of a solvent consisting of 60% by weight phenol and 40% by weight tetrachloroethane.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A method of preparing a reinforced polyester composition comprising the steps of:
   I. mixing
      (a) at least one cyclic ester oligomer selected from the group consisting of ethylene terephthalate and cyclohexylenedimethylene terephthalate;
      (b) an organic initiator comprising one to five hydroxy groups which are capable of opening the ring of the cyclic ester oligomer;
      (c) a catalyst; and
      (d) a reinforcing material, and
   II. reacting the mixture of Step I at a temperature of from about 270° C. to about 320° C.,
   wherein the organic initiator transesterifies with the cyclic ester oligomer to form a prepolymer which undergoes polycondensation.

2. The method as claimed in claim 1 wherein said organic initiator comprises one to three hydroxy groups.

3. The method as claimed in claim 1 wherein said organic initiator comprises two hydroxy groups.

4. The method as claimed in claim 1 wherein said catalyst is selected from the group consisting of titanium or antimony.

5. The method as claimed in claim 1 wherein said temperature ranges from about 300° to about 320° C.

6. The method as claimed in claim 1 wherein said temperature ranges from about 270° to about 300° C.

* * * * *